United States Patent [19]
Dobbs

[11] 3,948,769
[45] Apr. 6, 1976

[54] LIGAND EXCHANGE PROCESS FOR REMOVAL OF AMMONIA

[75] Inventor: Richard A. Dobbs, Cincinnati, Ohio

[73] Assignee: The United States of America as represented by the United States Environmental Protection Agency, Washington, D.C.

[22] Filed: Apr. 8, 1974

[21] Appl. No.: 458,496

[52] U.S. Cl. .............................. 210/32; 210/38 R
[51] Int. Cl.² .......................................... B01D 15/06
[58] Field of Search ............. 55/70; 210/24, 32, 38, 210/26, 30; 423/237, 239

[56] References Cited
UNITED STATES PATENTS
3,332,737   7/1967   Kraus.................................. 210/24
3,842,000   10/1974   Dawson ............................... 210/38

OTHER PUBLICATIONS

"Ligand Exchange", Helfferich, American Chemical Society Journal, Vol. 84, pp. 3237–3245.

Primary Examiner—Charles N. Hart
Assistant Examiner—Ivars Cintins

[57] ABSTRACT

The selective removal of ammonia from waste water is achieved by the use of a ligand exchanger which has been conditioned with a salt of a metal which is capable of forming a complex with ammonia. The ligand exchanger is regenerated by contacting it with low pressure steam.

1 Claim, 1 Drawing Figure

LIGAND EXCHANGE PROCESS FOR REMOVAL OF AMMONIA

This invention provides a method for the selective removal of ammonia from aqueous solutions. More specifically it includes (1) the preparation of an exchanger so as to render it suitable for a ligand exchange process in which the ammonia is removed from the aqueous solution; (2) treating waste water which contains ammonia with the so-treated exchanger; and (3) regeneration of the exchanger to return it to a form suitable for removing ammonia from further batches of waste water.

Municipal and many industrial waste waters contain ammonia. Treatment of waste water to remove ammonia prior to discharge presents a real problem.

The removal of ammonia from gaseous mixtures is a highly developed art and known procedures for effecting such removal include absorption by porous absorbents which may be treated to improve the process, and complexing the ammonia to form amines.

When efforts are made to treat an ammonia-containing liquid with absorbents which have been chemically or physically treated it was found that the liquid rapidly washed out the treatment from the absorbent and rendered the same ineffective for the removal of ammonia from liquids.

Attempts to utilize conventional ion exchange resins for the removal of ammonia have been equally unsuccessful because such resins are not selective toward ammonia. In addition, chemical regeneration of the resin is required to restore it for reuse.

The principal objects of this invention are to a process which is selective for the removal of ammonia from aqueous solutions such as municipal and industrial waste waters and in which chemical regenerants are not required and one in which disposal problems are minimal.

These and other objects of the invention will be pointed out or will become apparent from the description which follows, of a preferred embodiment of the invention.

In the first step in the process of the present invention a suitable exchanger (i.e., a synthetic resin or inorganic exchanger) is treated with a solution containing a metal ion which forms a complex with ammonia (i.e., $Cu^{++}$, $Ni^{++}$ and others). Exchangers which are suitable include synthetic resins with carboxylic groups and inorganic hydrous metal oxides. Resins which contain carboxylic groups and inorganic exchangers of the hydrous metal oxide type have exchange capacities which are strongly dependent on the pH of the solution. In the present invention the complexing metal ion is loaded on the exchanger as the metal amine complex (i.e., $Cu(NH_3)_4^{++}$) under strongly basic conditions, since when the complexing metal is loaded on the exchanger with the usual acidic salt solutions, (such as $CuSO_4$, $CuCl_2$, $CuNO_3$, etc.), the copper content of the exchanger is low. As a result of loading the exchanger under strongly basic conditions, resins with carboxylic groups are more completely ionized and will contain more complexing metal ion at equilibrium. Also, the inorganic hydrous metal oxides will exhibit higher capacities for the metal ion at elevated pH. This method of preparation results in greater ligand exchange properties for the exchanger and, therefore, greater capacity for ammonia removal.

The invention will be more fully understood from the description which follows taken in conjunction with the drawings in which.

The exchanger, when loaded with the proper metal counterion will remove ammonia from aqueous solution by ligand exchange according to the following equation:

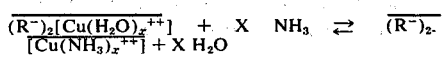

where $R^-$ represents the exchanger. Bars refer to the exchanger phase. The coefficient X approaches four in the case of $Cu^{++}$ and six in the case of $Ni^{++}$. An appropriate cupric salt (e.g., chloride, sulfate or nitrate), was dissolved in water to form a moderately concentrated solution. Specifically, 75 gm of $Cu(NO_3)_2 \cdot 6H_2O$ was added to 1.0 liter of distilled water. Concentrated ammonium hydroxide was added until the copper was precipitated and redissolved forming the soluble cupric amine cation $Cu(NH_3)_4^{++}$ (pH>12). Hydrous zirconium oxide is converted to the cupric amine form by contacting the hydrous zirconium oxide with this solution for an appropriate time either batchwise or in a column operation. This cupric form of the exchanger is rinsed with water and then converted to the hydrated form by using low pressure steam at about 10 to 100 psig. The exchanger was now ready for a loading cycle (conversion to the amine form by removal of ammonia from an aqueous solution).

Figure 1:
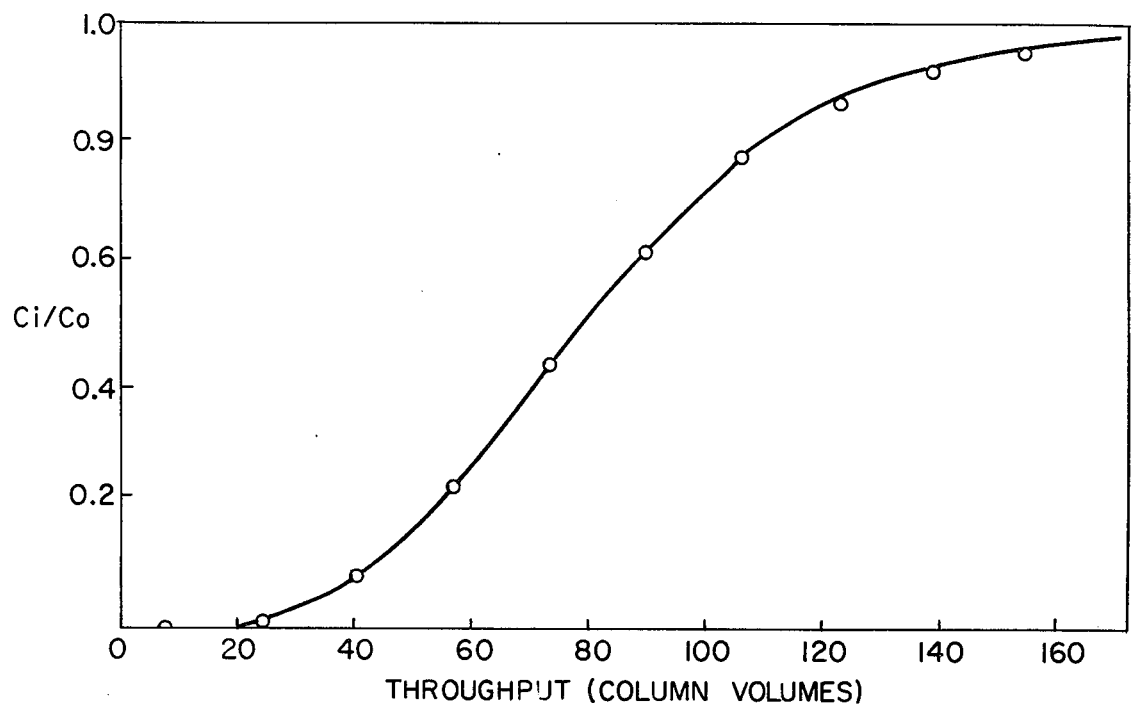
FIG. 1 shows the results for removal of ammonia from an aqueous feed.

A feed solution containing 20 mg/l $NH_3$ was prepared from ammonium chloride and distilled water. Sodium hydroxide was used to adjust the pH of the ammonia containing feed solution to about 11, prior to treatment. Approximately 80 column volumes were treated before ammonia nitrogen breakthrough reached 50%. FIG. 1 shows a breakthrough curve for this Example. Comparable results have been obtained using municipal waste water.

A further advantage over the prior art involves the method of regeneration of the exhausted exchanger. Use of acidic regenerants is completely unacceptable for the treatment of municipal waste water. With acid regeneration all exchangers showed significant losses of complexing metal ion (copper). Such metal ion losses result in decreased ligand exchange capacity. In the present invention, the exhausted exchanger is regenerated for reuse by treatment with low pressure steam or hot water. Regeneration occurs according to the following equation:

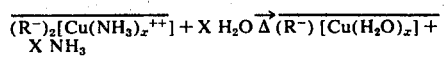

Figure 2:
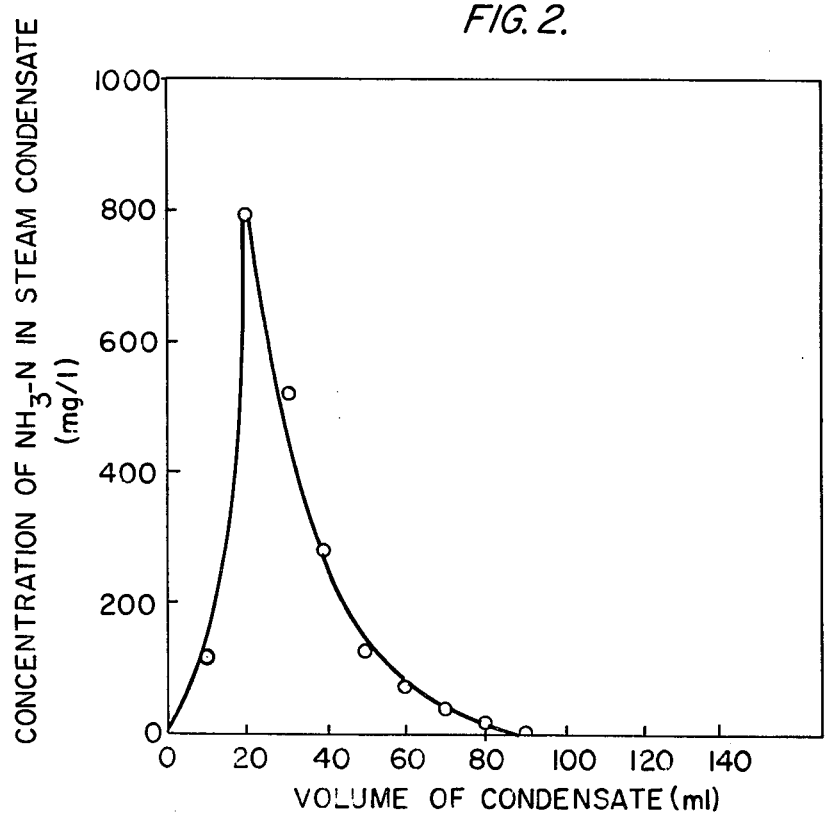
FIG. 2 shows the regeneration of the ligand exchanger of FIG. 1.

Thermal regeneration not only avoids the problem of metal losses from the exchanger but also eliminates the need for chemicals and minimizes the problems associated with the ultimate disposal of the spent regenerant solutions. FIG. 2 illustrates the regeneration of an exhausted ligand exchanger with low pressure steam. The 15 cm³ column of hydrous zirconium oxide was regenerated with steam at 30 psig (135°C). Most of the ammonia nitrogen is removed in the first 50 ml portion of steam condensate.

Loss of copper from the exchanger during the ammonia removal cycle was extremely small using hydrous zirconium oxide. Typically, the copper content of the treated water measured less than 1 µg/lCu$^{++}$.

In the loading cycle, it is desirable to elevate the pH in order to shift the equilibrium:

$$NH_4^+ \rightleftarrows NH_3 + H^+$$

to the right since only $NH_3$ is removed by ligand exchange.

In the regeneration step, the thermal process may involve hot air or water or low pressure steam. Low pressure steam is advantageous because it provides the ligand (water) to restore the resin for reuse.

I claim:

1. A process for removing ammonia from waste water which comprises:

conditioning a hydrous zirconium oxide ligand exchanger to accept ammonia in solution, by contacting said exchanger with a strongly basic solution of a metal capable of forming a complex with $NH_3$;

thereafter bringing an ammonia containing solution into contact with said conditioned ligand exchanger whereby ammonia is complexed with said exchanger;

and regenerating said ligand exchanger by contacting it with steam at a pressure of about 30 PSIG and at a temperature of about 135°C.

* * * * *